United States Patent [19]

Wallis

[11] 4,088,034
[45] May 9, 1978

[54] CHAIN DRIVE FOR A WORKPIECE TRANSFER MECHANISM

[76] Inventor: Bernard J. Wallis, 25200 Trowbridge Ave., Dearborn, Mich. 48124

[21] Appl. No.: 672,983

[22] Filed: Apr. 2, 1976

[51] Int. Cl.² ............................................. F16H 19/06
[52] U.S. Cl. .......................................... 74/37; 74/240
[58] Field of Search ........................ 74/37, 250 C, 244

[56] References Cited

U.S. PATENT DOCUMENTS

| 2,640,585 | 6/1953 | Orwin | 74/246 |
| 2,663,341 | 12/1953 | Grove | 74/37 |
| 2,728,238 | 12/1955 | Paasche | 74/37 |
| 2,941,657 | 6/1960 | Newcomb et al. | 74/246 |

FOREIGN PATENT DOCUMENTS 1,102,150  4/1955  France ....................... 74/37

Primary Examiner—Benjamin W. Wyche
Assistant Examiner—Wesley S. Ratliff, Jr.
Attorney, Agent, or Firm—Barnes, Kisselle, Raisch & Choate

[57] ABSTRACT

A chain drive for a workpiece transfer mechanism wherein a pair of coaxial rollers mounted on a chain extending around a pair of spaced sprockets engage the slotted legs of a yoke depending from a carriage. The carriage is reciprocated as the rollers travel around the endless path of the chain. At each sprocket guide tracks are provided which are engaged by the rollers on the chain to guide the rollers in an arcuate path around the sprockets.

9 Claims, 6 Drawing Figures

CHAIN DRIVE FOR A WORKPIECE TRANSFER MECHANISM

This invention relates to a chain drive for a workpiece transfer mechanism.

Transfer mechanisms are frequently used with stamping presses for loading and/or unloading the die with workpieces. Such mechanisms usually employ a carriage and a drive for reciprocating the carriage toward and away from the die in the press. The carriage is usually provided with work-engaging fingers for transferring workpieces into and out of the die as the carriage reciprocates. One type of drive mechanism for the carriage employs an endless chain extending around a pair of spaced sprockets and having a pair of coaxial rollers mounted on opposite sides of the chain to travel therewith in an endless path between and around the two sprockets. The carriage (or a slide which drives the carriage) has a yoke thereon provided with spaced apart legs which straddle the chain. The legs have elongated slots therein which extend transversely of the chain and in which the rollers on the chain are engaged so that, as the rollers travel between and around the sprockets, the rollers reciprocate the yoke through a desired stroke as they travel lengthwise in the slots on the yoke.

One of the problems encountered with chain drives of this type is the inability to obtain a stroke of an accurately predetermined length so that the workpieces will be deposited in an accurately located position in the die. This problem frequently results from overtravel or undertravel of the yoke. This is brought about by the fact that the reciprocating stroke of the yoke is determined by the linear displacement of the rollers in a direction lengthwise of the chain. Thus, if the chain becomes loose or slack as a result of wear in the chain link connection or of the sprocket teeth, the stroke of the yoke (and consequently of the carriage) may vary from one reciprocation to the next.

The object of this invention is to provide a chain drive for a transfer mechanism designed to produce an accurately predetermined stroke of the carriage regardless of any looseness in the chain.

More specifically, the present invention contemplates a chain drive of the type described wherein the rollers engage accurately positioned tracks as they travel around the outer periphery of the two sprockets so that the linear displacement of the rollers in the direction of the chain travel is not determined by the interengagement of the chain with the sprockets, but rather by the interengagement of the rollers with the accurately positioned tracks at the two sprockets.

Other features, objects and advantages of the present invention will become apparent from the following description and accompanying drawings, in which.

Figure 1:
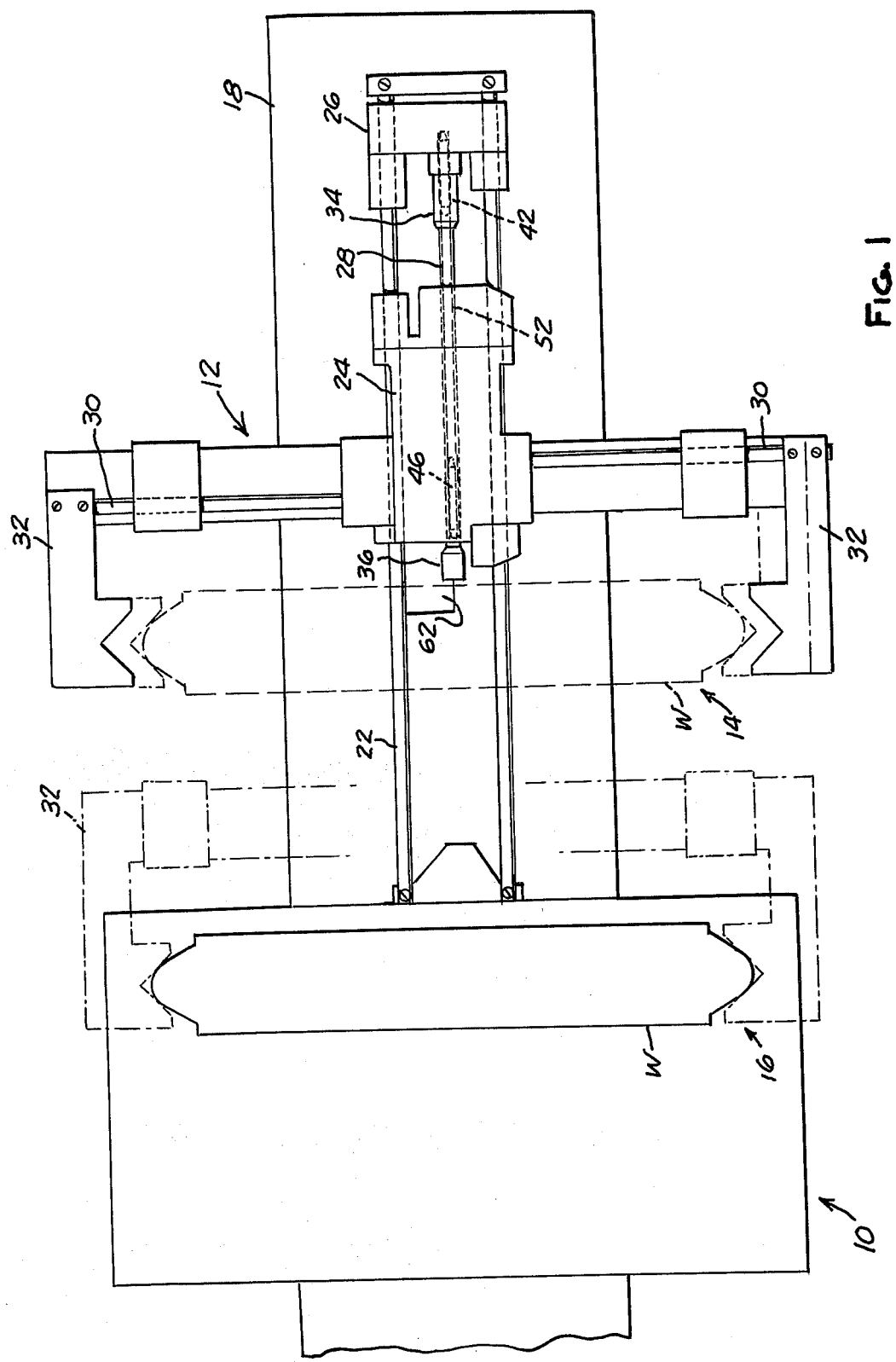
FIG. 1 is a plan view of a workpiece transfer mechanism embodying the present invention.

Referring to FIG. 1, there is illustrated a stamping press, generally designated 10, and a workpiece transfer mechanism, generally designated 12, for transferring workpieces W between a loading or unloading station 14 and a work station 16 in the press. The transfer mechanism includes a base plate 18 supported adjacent the press in any suitable manner, such as by legs 20. A pair of parallel spaced guide bars 22 are mounted on base plate 18 in any suitable fashion. Guide bars 22 support a carriage 24 and a slide 26 for rectilinear movement. An actuator shaft 28 fixedly connected to slide 26 extends through carriage 24 and is connected with gearing in the carriage to reciprocate finger bar rods 30 simultaneously in opposite direction. Workpiece engaging fingers 32 are secured to the outer ends of rods 30.

The transfer mechanism thus far illustrated is generally of the type disclosed in my prior U.S. Pat. No. 3,411,636, dated Nov. 19, 1968. In FIG. 1 carriage 24 is illustrated in its retracted position where it is locked on base plate 18 by suitable latches (not illustrated). When actuator 28 is shifted to the left as viewed in FIG. 1, initially fingers 32 are shifted inwardly toward each other to engage a workpiece at station 14. Thereafter a bushing 34 on actuator 28 abuts the adjacent end of carriage 24 to release the carriage locking latches and shift the carriage to its advanced position where the workpiece is located at station 16 in the die. When actuator 28 is retracted in the opposite direction by slide 26, initially fingers 32 are shifted outwardly to the retracted position to release the workpiece and thereafter the bushing 36 at the opposite end of actuator 28 releases the carriage locking latches and shifts the carriage on guide bars 22 back to the retracted position illustrated in FIG. 1. A more detailed description of this arrangement is contained in my prior U.S. Pat. No. 3,411,636, but is not necessary for an understanding of the present invention.

Figure 2:
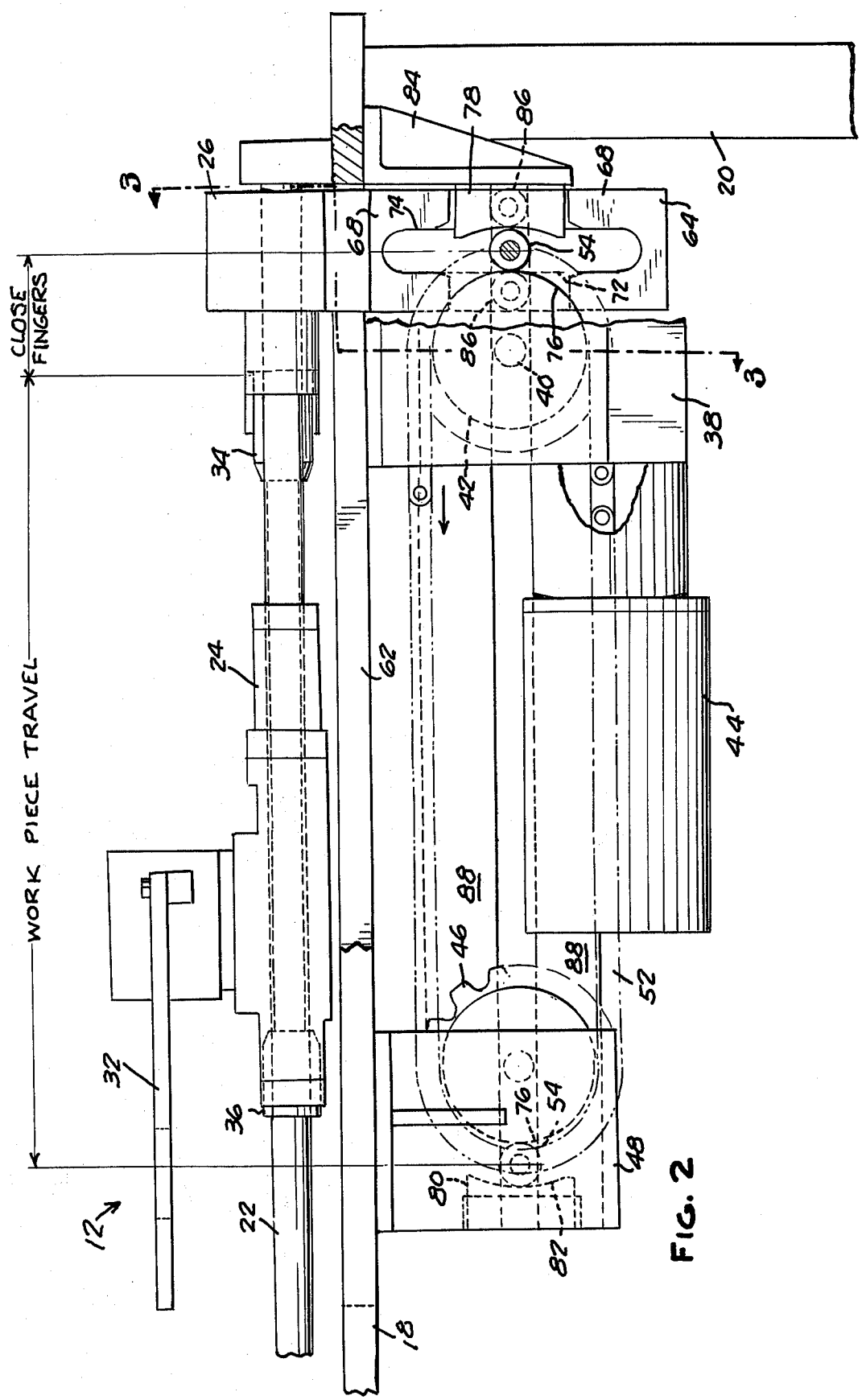
FIG. 2 is a fragmentary side elevational view, partly in section, of a portion of the mechanism illustrated in FIG. 1.
Figure 3:
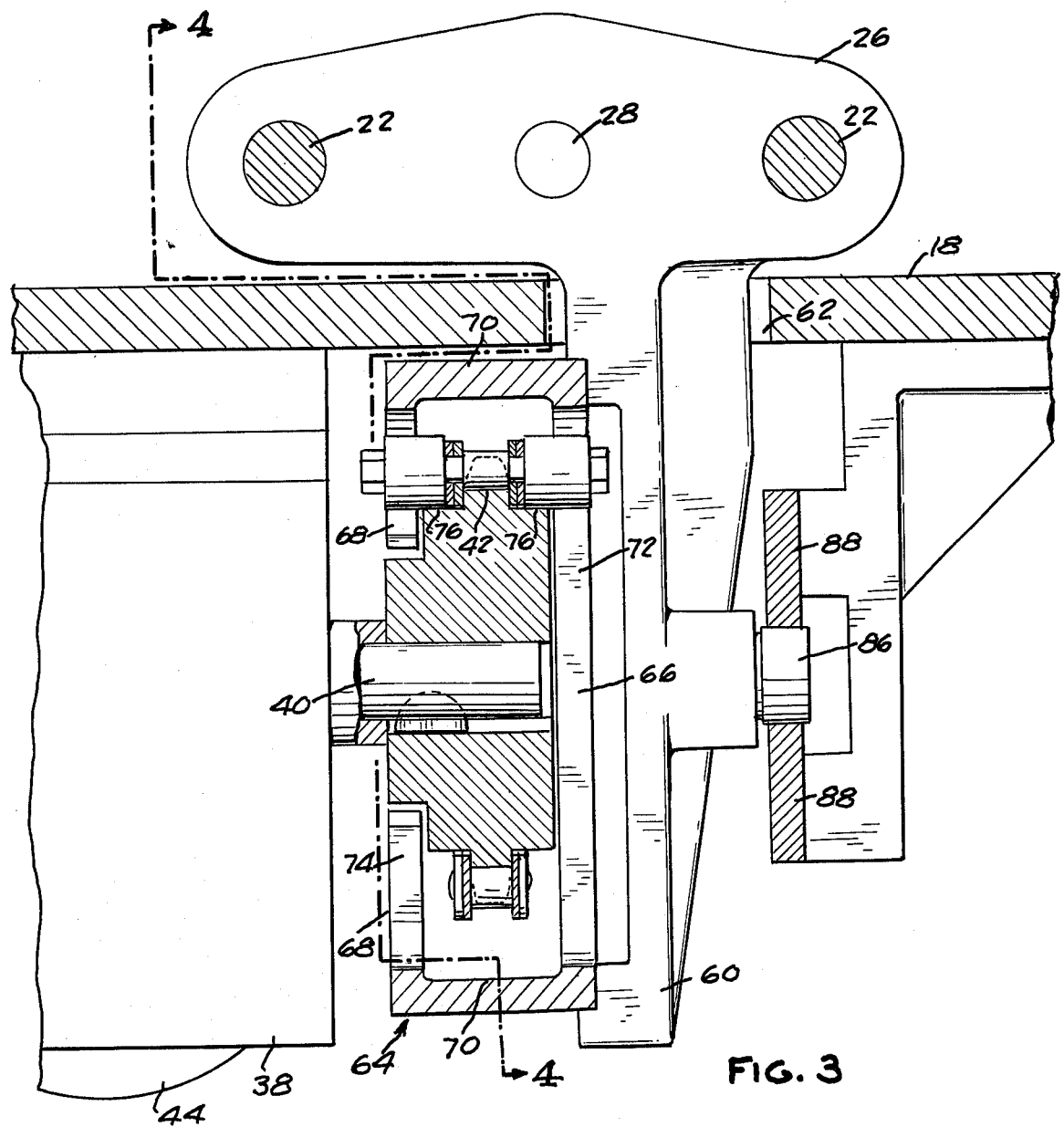
FIG. 3 is a sectional view along line 3—3 in FIG. 2 with the yoke shown at the section line.
Figure 5:
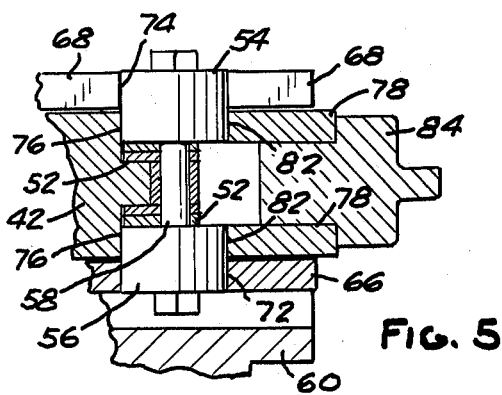
FIG. 5 is a sectional view along line 5—5 in FIG. 4.

The present invention is directed specifically to the means employed for reciprocating slide 26 and actuator 28. These means are best illustrated in FIG. 2. On the underside of base plate 18 there is fixedly supported a gear box 38, the output of which comprises a stub shaft 40 on which a sprocket 42 is keyed (FIG. 3). Shaft 40 is driven in a counter-clockwise direction by a motor 44. A second sprocket 46 is also journalled on the underside of base plate 18 by a bracket 48 which is fixedly secured to base plate 18. Sprocket 46 is journalled on bracket 48 by a stub shaft 50. Stub shafts 40,50 are parallel and arranged perpendicular to guide bars 22 for carriage 24. An endless chain 52 is trained around sprockets 42,46. To one of the links of chain 52 there is attached a pair of rollers 54 and 56 (FIG. 5). These rollers are arranged on opposite sides of chain 52 and are journalled on a pin 58. Thus, when stub shaft 40 is driven by motor 44, rollers 54,56 travel with chain 52 in an endless path around the sprockets.

Figure 4:
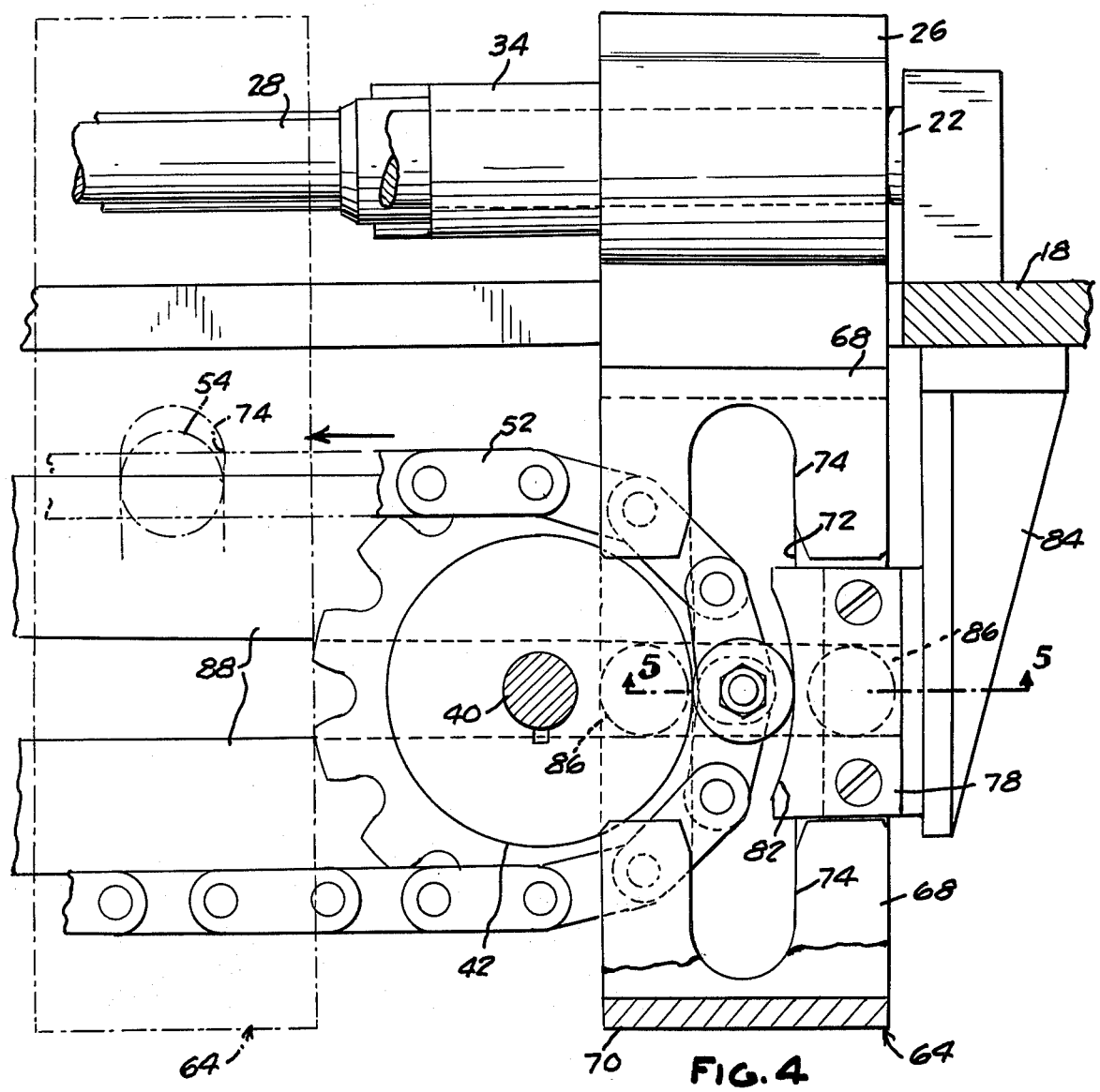
FIG. 4 is a sectional view along line 4—4 in FIG. 3 with the yoke shown in the position illustrated in FIG. 2.

Referring now to FIGS. 3 and 4, slide 26 has a depending bracket portion 60 which extends downwardly through a slot 62 in base plate 18. A C-shaped yoke 64 is mounted on bracket 60 as shown in FIG. 3. Yoke 64 has a vertical leg 66 extending the full height thereof and a pair of opposed legs 68 connected to leg 66 by upper and lower bight portions 70. It will be observed that legs 68 are relatively short and clear stub shafts 40,50 which support the sprocket. Leg 66 has a vertical slot 72 extending substantially the full length thereof.

Legs 68 each have a vertical slot 74 therein. Slots 74 are vertically aligned and their confronting ends are open. Roller 56 is engaged in slot 72 and has a diameter generally corresponding to the width of slot 72. Thus, roller 56 is trapped in slot 72 and causes yoke 64 to reciprocate lengthwise of slot 62 as it travels between and around sprockets 42,46. When roller 56 is disposed along the top run of chain 52, it engages slot 72 adjacent the upper end thereof. When roller 56 is disposed along the lower run of chain 52 it engages slot 72 adjacent the lower end thereof. As roller 56 travels an arcuate path around sprocket 46 it moves downwardly in slot 72 and as it travels an arcuate path around sprocket 42 it moves upwardly in slot 72. In the embodiment illustrated rollers 56,54 are of the same diameter and slots 72,74 are of the same width. As roller 54 travels the lower run of chain 52 it engages lower slot 74 adjacent its lower end and as roller 54 travels the upper run of chain 52 it engages the upper slot 74 adjacent its upper end. When roller 54 is travelling an arcuate path around sprockets 42,46 it becomes disengaged from both slots 74.

As best illustrated in FIGS. 3 and 5, each sprocket 42,46 is formed with a circular track 76 on the opposite faces thereof. Tracks 76 are concentric with the axes of rotation of the two sprockets. In the embodiment of the invention illustrated tracks 76 are defined by an enlarged cylindrical hub portion on each sprocket. Any suitable means may be employed to provide the function of concentric tracks 76. The diameters of tracks 76 are accurately dimensioned so that as the rollers 54,56 approach each of the sprockets they engage the tracks tangentially and are guided thereby around the sprockets in an arcuate path accurately concentric with and at a fixed radius from the axis of rotation of the sprocket. Thus, as the rollers travel around the sprockets at the opposite ends of the stroke of slide 26, the endmost position of the slide is determined by the interengagement of rollers 54,56 with tracks 76. This not only stabilizes the two rollers laterally and vertically, but, more importantly, overcomes the problem of slack in the chain due to wear of the sprocket teeth.

Rollers 54,56 are further guided as they travel around the outer periphery of each sprocket by guide blocks 78,80, each of which is formed with an arcuate guide track 82. Guide tracks 82 are concentric with the axes of rotation of the two sprockets and are spaced radially from guide tracks 76 a distance corresponding to the diameter of rollers 54,56. Guide blocks 78 are fixedly mounted on a bracket 84 depending from the lower side of base plate 18 and guide blocks 80 are mounted on bracket 48. Guide tracks 82 are formed as circular segments having a vertical extent slightly less than the vertical distance between the opposed ends of legs 68. Guide blocks 78,80 are located such that the arcuate tracks traverse a horizontal line extending through the axes of rotation of the two sprockets. Since tracks 76 and tracks 82 are accurately concentric with the axes of the sprockets and are spaced radially apart a distance corresponding accurately to the diameter of the rollers, it follows that, as the rollers travel around the outer peripheries of the two sprockets, they are constrained to follow an arcuate path which is very accurately located relative to the axes of rotation of the two sprockets. Overtravel of the rollers due to slack in the chain is prevented by tracks 82 and undertravel of the rollers due to wear on the sprocket teeth is prevented by tracks 76. Thus, by reason of the arcuate tracks 76,82, the linear displacement of rollers 54,56 and, consequently, the displacement of slide 26 are both equal precisely to the distance between the axes of shafts 40,50 plus twice the radius of tracks 76 and twice the radius of rollers 54,56.

In an arrangement such as illustrated in the drawings where the two sprockets 42,46 are disposed in the vertical plane below carriage 24, the force exerted by rollers 54,56 on yoke 64, especially on the retraction stroke of the carriage, is displaced a considerable distance below guide bars 22. In order to minimize the effect of the torque on yoke 64 bracket 60 has mounted thereon a pair of laterally spaced rollers 86 which are guided horizontally in a trackway defined by the opposed edges of a pair of guide bars 88. It will be appreciated that, if sprockets 42,46 are journalled on vertical axes rather than horizontal axes and are located in a horizontal plane closely adjacent base plate 18, the reciprocating drive mechanism will operate in substantially the same manner as described, but the need for the guide structure provided by rollers 86 and guide bars 88 is substantially lessened.

Figure 6:
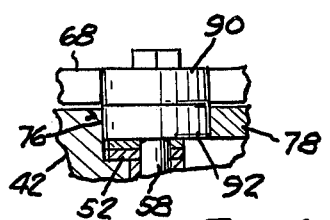
FIG. 6 is a view similar to FIG. 5 and showing a modified roller arrangement.

In FIG. 6 there is illustrated a slight modification of the roller arrangement. In this arrangement the rollers on each side of the chain are split into pairs, the outer rollers 90 being disposed to engage in the slots 72,74 of the yoke and the inner rollers 92 being located to engage tracks 76,82. This arrangement will tend to produce less wear on the rollers and the tracks since the surface speed of the rollers engaging the straight slots 72,74 is different from the surface speed of the rollers engaging tracks 76,82.

I claim:

1. In a reciprocating drive mechanism of the type comprising an endless chain extending around a pair of sprockets mounted on a support with their axes in spaced parallel relation, a drive member fixed to said chain for movement therewith in an endless path around said sprockets, said drive member extending transversely of the chain on an axis parallel to the axis of rotation of the sprockets, and a driven member operably connected with said drive member and mounted on said support for reciprocation in response to displacement of said drive member along the path of travel of said chain, the stroke of said driven member being determined by the displacement of said drive member in the direction of a line extending between and perpendicular to the axes of said sprockets, the improvement which comprises, a pair of radially spaced inner and outer guide tracks adjacent each sprocket concentric to the axes of rotation of the sprockets, said guide tracks being spaced radially from the axes of rotation of the sprockets, the radial spacing between said tracks being such that the drive member engages each guide track and has a close fit therebetween as it travels around each of the sprockets.

2. The improvement called for in clam 1 wherein each outer track has an arcuate extent of not more than 180° and is disposed adjacent the arcuate path of travel of the chain around the sprockets.

3. The improvement called for in claim 2 wherein the drive member comprises a roller.

4. The improvement called for in claim 9 wherein the inner tracks are mounted on the sprockets and the outer tracks are mounted on the support.

5. The improvement called for in claim 3 wherein the operative connection between the roller and the driven member includes a leg member having an elongated slot therein extending in a direction transversely of the portions of the chain extending between the sprockets, said roller being engaged in said slot and being constrained to move lengthwise of the slot.

6. The improvement called for in claim 1 wherein the drive member extends outwardly from opposite sides of the chain, said inner and outer tracks being disposed to be engaged by the portions of the drive member on opposite sides of the chain.

7. The improvement called for in claim 6 wherein said drive member comprises a pair of coaxial rollers disposed on opposite sides of the chain.

8. The improvement called for in claim 6 wherein the drive member comprises a pair of coaxial rollers mounted one on each side of the chain and the operative connection between the driven member and the drive member includes a yoke having a pair of legs straddling the chain, said legs each having an elongated slot therein extending generally transversely of the portions of the chain extending between the sprockets, said rollers being engaged one in each of said slots for movement lengthwise thereof.

9. The improvement called for in claim 7 wherein the inner tracks are mounted on opposite sides of the sprockets and the outer tracks are mounted on the support, said outer tracks having an arcuate extent of not more than 180° and being disposed adjacent the arcuate path of travel of the chain around the sprockets.

* * * * *

UNITED STATES PATENT OFFICE
CERTIFICATE OF CORRECTION

PATENT NO. : 4,088,034
DATED : MAY 9, 1978
INVENTOR(S) : BERNARD J. WALLIS

It is certified that error appears in the above-identified patent and that said Letters Patent are hereby corrected as shown below:

Column 4, line 62    Cancel "9" and insert -- 3 --

Signed and Sealed this

Twelfth Day of September 1978

[SEAL]

Attest:

RUTH C. MASON
Attesting Officer

DONALD W. BANNER
Commissioner of Patents and Trademarks